UNITED STATES PATENT OFFICE.

EDWIN T. BEAL, OF HULL, ENGLAND, ASSIGNOR, BY MESNE ASSIGNMENTS, TO GRACE M. TOOBE, OF BROOKLYN, NEW YORK.

ART OF PREPARING ZINC PLATES FOR LITHOGRAPHIC PRINTING.

SPECIFICATION forming part of Letters Patent No. 543,638, dated July 30, 1895.

Application filed December 22, 1894. Serial No. 532,709. (No specimens.)

*To all whom it may concern:*

Be it known that I, EDWIN T. BEAL, a subject of the Queen of Great Britain, residing at Hull, in the county of York, England, have invented a new and useful Improvement in the Art of Preparing Zinc Plates for Lithographic Printing, of which the following is a specification.

My invention relates, first, to the treatment of plates of zinc with chemicals, as hereinafter described, so as to produce a surface which can be used in lithographic printing, and, secondly, to the retreatment of plates so prepared to remove the old design and adapt them, after preparation, to take a new design.

In carrying out my invention I take zinc plates and subject the surface to the action of a sand-blast, or by other well-known mechanical means dull the surface. The plates are then adapted to receive a chemical mixture which I produce by dissolving in two gallons of water about ten pounds of sulphate of alumina and potassa, (alum,) about five pounds of nitrous acid, about two and one-half pounds of chloride of calcium, and about two and one-half pounds of sulphate of zinc. The plates being placed in a bath or open vessel, this solution is poured over them and they are left in the bath for a few minutes. The plates are then removed from the bath, rinsed with pure water, and dried, and the chemicals will be found to have so combined with the surface of the plates as to adapt them to be used in lithographic printing for everything for which stones are used, so that my improved plates are proved by the results produced in practical use to constitute a complete substitute for the best stone.

Plates which have been prepared by my improved process and used for lithographic printing are cleansed and reprepared for subsequent use in the following manner: After the ink and color of the previous job are washed out with turpentine or other cleansing agent in the usual way, I apply to the plates a solution made by dissolving five ounces of oxide potassium in ten ounces of water, and then, after thorough rinsing in clean water, place them in the bath of sulphate of alumina and potassa, (alum,) nitrous acid, chloride of calcium, and sulphate of zinc. The plates are then ready for a new job with the same excellent results as when first manufactured.

Having thus described my invention, the following is what I claim as new and desire to secure by Letters Patent:

1. The process of preparing zinc plates for lithographic printing, which consists in dulling the surface, and then subjecting it to the action of a solution of sulphate of alumina and potassa (alum), sulphate of zinc, nitrous acid and chloride of calcium substantially as described.

2. The process of preparing zinc plates for lithographic printing, which consists in cleansing the surface, washing with a solution of potassium oxide in water to remove a previous design, and then subjecting to a bath containing sulphate of zinc together with nitrous acid and chloride of calcium, substantially as set forth.

EDWIN T. BEAL.

Witnesses:
L. EWBANK,
GEORGE H. HILL.